US008047243B2

(12) United States Patent
Simon et al.

(10) Patent No.: US 8,047,243 B2
(45) Date of Patent: Nov. 1, 2011

(54) REPLACEMENT TREAD FOR A TRUCK RACING TIRE

(75) Inventors: Audrey Marie Simon, Watermael-Boitsfort (BE); Murat Ahmet Yasar Susutoglu, Bissen (LU); Vincent Benoit Mathonet, Habay la Neuve (BE); Daniel Roder, Bissen (LU); Jean-Nicolas Pierre Claude Helt, Braumont (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 903 days.

(21) Appl. No.: 12/046,482

(22) Filed: Mar. 12, 2008

(65) Prior Publication Data

US 2009/0229719 A1 Sep. 17, 2009

(51) Int. Cl.
*B60C 11/02* (2006.01)
*B60C 11/03* (2006.01)

(52) U.S. Cl. ............... 152/176; 152/209.6; 152/209.8; 152/209.28; 152/901; 156/96

(58) Field of Classification Search .............. 152/175, 152/176, 187, 188, 209.5, 209.6, 209.8, 209.28, 152/901; 156/96
See application file for complete search history.

(56) References Cited

U.S. PATENT DOCUMENTS

| 2,272,879 | A | * | 2/1942 | Hargraves | 152/209.22 |
|---|---|---|---|---|---|
| 3,494,401 | A | * | 2/1970 | Bush | 152/209.18 |
| D324,840 | S | | 3/1992 | Maxwell et al. | D12/147 |
| D347,816 | S | | 6/1994 | Maxwell et al. | D12/147 |
| 5,358,020 | A | | 10/1994 | Haas | 152/209 R |
| D400,132 | S | | 10/1998 | Maxwell | D12/146 |
| 5,833,781 | A | * | 11/1998 | Fukumoto et al. | 152/209.19 |
| D409,959 | S | | 5/1999 | Maxwell | D12/147 |
| 6,264,779 | B1 | * | 7/2001 | Cappelli et al. | 156/123 |
| D451,448 | S | | 12/2001 | Maxwell | D12/147 |
| D488,430 | S | | 4/2004 | Maxwell | D12/544 |
| D501,822 | S | | 2/2005 | Ratliff, Jr. et al. | D12/565 |
| D505,386 | S | | 5/2005 | Maxwell et al. | D12/581 |
| 6,923,232 | B1 | * | 8/2005 | Welbes et al. | 152/209.18 |
| 7,140,410 | B2 | * | 11/2006 | Helt et al. | 152/154.2 |
| 7,322,391 | B2 | * | 1/2008 | Metz | 152/209.18 |
| 7,484,543 | B2 | * | 2/2009 | Colombo et al. | 152/209.8 |
| 2006/0005904 | A1 | | 1/2006 | Helt et al. | 152/154.2 |

FOREIGN PATENT DOCUMENTS

| EP | 0492048 A2 | 7/1992 |
|---|---|---|
| EP | 0704324 A2 | 4/1996 |

(Continued)

OTHER PUBLICATIONS

European Search Report completed Jun. 4, 2009.

*Primary Examiner* — Justin R Fischer
*Assistant Examiner* — Robert Dye
(74) *Attorney, Agent, or Firm* — Robert N. Lipcsik

(57) ABSTRACT

A retreaded pneumatic truck tire includes a used carcass having a uniform annular attachment area and a retread element. The retread element secures to the attachment area of the used carcass. The retread element has a tread pattern comprising a first circumferential groove separating the tread pattern into a first shoulder rib and an intermediate rib and a second circumferential groove separating the tread pattern into the intermediate rib and a second shoulder rib. The tread pattern further comprises a first plurality of identical arcuate notches extending axially and circumferentially across the first circumferential groove and a second plurality of identical arcuate notches extending axially and circumferentially across the second circumferential groove. The first plurality of arcuate notches are offset circumferentially from the second plurality of arcuate notches.

18 Claims, 4 Drawing Sheets

FOREIGN PATENT DOCUMENTS

| | | | |
|---|---|---|---|
| EP | 0997323 | A2 | 5/2000 |
| EP | 1008465 | A2 | 6/2000 |
| GB | 1360203 | A | 7/1974 |
| JP | 06-286424 | * | 10/1994 |

* cited by examiner

REPLACEMENT TREAD FOR A TRUCK RACING TIRE

FIELD OF THE INVENTION

The present invention relates generally to a truck tire and, more specifically, to a replacement tire tread for truck racing tire applications.

BACKGROUND OF THE INVENTION

Pneumatic rubber tires are conventionally prepared with a rubber tread which can be a blend of various rubbers, typically reinforced with carbon black. In one aspect, truck tires and other relatively large tires are normally expected to be capable of supporting and carrying relatively large vehicular loads that generate a greater internal temperature than comparable passenger tires.

Truck tire treads are typically of a cap/base construction, with a tread cap designed to be ground-contacting with a lug/groove ground-contacting configuration and a tread base underlying and supporting the tread cap and positioned between the tread cap and the tire casing or carcass. Generally, the tread cap and tread base are a co-extruded component of the tire. The tread base is not intended to normally be ground-contacting and, thus, not normally intended to have the same measure of tread properties as, for example, the tread cap properties of traction and treadwear resistance.

For a typical bias ply truck tire tread cap, the tread base is relatively thick compared to the thickness of the tread cap, often 50 percent of the thickness of the tread cap instead of the relatively thin tread base of 25 percent for a passenger tire. This is in contrast to radial ply tires, such as passenger tires and light truck tires, which often have a tread of a cap/base construction where the tread base is often relatively thin (i.e., less than 25 percent of the thickness of the associated tread cap).

For such relatively heavy duty tires, heat buildup is normally undesirable, but typically unavoidable during operation of the tire under load. Thus, it remains desirable to provide a replacement tire tread for use with tires on trucks, including racing trucks, which will allow a serviceable carcass and belt reinforcement structure to be reused once the effective life of the tread has been exhausted. More specifically, racing applications generate higher temperature and heat conditions tending to prematurely wear and age the tread and thereby shorten the effective life of the tread, but typically not the carcass and belt reinforcement structure. Extending the effective life of the costly carcass and belt reinforcement structure is considered herein to be important because the above stated desire to retread the carcass and belt reinforcement structure after the tire tread becomes worn.

Further, tires generally have a tread that is well suited for a specific vehicle application. Certain tread and reinforcement packages specifically designed for truck racing are well known. The considerations relevant to a tire for such an application are, among others, tread configuration, reinforcement package disposition, and material composition. However, as would be expected, shortcomings of conventional truck racing tires remain, including excessive wear and extremely short tread life. It would be desirable to reuse the carcass and belt reinforcement structure by replacing a worn tread of a truck racing tire with a retread element.

SUMMARY OF THE INVENTION

The present invention provides a retreaded pneumatic truck tire comprising a used carcass having a uniform annular attachment area and a retread element. The retread element secures to the attachment area of the used carcass. The retread element has a tread pattern comprising a first circumferential groove separating the tread pattern into a first shoulder rib and an intermediate rib and a second circumferential groove separating the tread pattern into the intermediate rib and a second shoulder rib. The tread pattern further comprises a first plurality of identical arcuate notches extending axially and circumferentially across the first circumferential groove and a second plurality of identical arcuate notches extending axially and circumferentially across the second circumferential groove. The first plurality of arcuate notches are offset circumferentially from the second plurality of arcuate notches.

Pursuant to another aspect of the present invention, the used carcass includes radial plies extending from, and wrapped about, two annular beads and the tire further includes a belt reinforcement structure disposed radially outward of the radial plies.

Additionally, pursuant to a further aspect of the present invention, the used carcass includes an innerliner forming a somewhat air impervious chamber to contain the air pressure when the tire is inflated.

Pursuant to another aspect of the present invention, the tire further includes a belt reinforcement structure having three cord reinforced belts.

According to yet another aspect of the present invention, shoulder ribs are configured with angled lateral edge surfaces for optimizing vehicle stability and handling.

Pursuant to a further aspect of the present invention, each of the first and second pluralities of arcuate notches narrow as each notch extends nearer an equatorial plane of the tire.

Further, pursuant to another aspect of the present invention, each arcuate notch of the first plurality of arcuate notches begins at a first distance from an equatorial plane of the tire and terminates at a second distance from the equatorial plane of the tire.

Pursuant to still another aspect of the present invention, each arcuate notch of the second plurality of arcuate notches begins at the first distance from an equatorial plane of the tire and terminates at the second distance from the equatorial plane of the tire.

Also, pursuant to still yet another aspect of the present invention, each arcuate notch of the first and second pluralities of arcuate notches is generally U-shaped in cross-section and has a depth of about 3.5 mm.

Additionally, pursuant to a yet further aspect of the present invention, each arcuate notch of the first and second pluralities of arcuate notches begins with a ramp extending arcuately and radially inward from outer surfaces of the first and second shoulder ribs.

Pursuant to a still further aspect of the present invention, each arcuate notch of the first and second pluralities of arcuate notches terminates with a ramp extending arcuately and radially outward to outer surfaces of the first and second shoulder ribs.

Furthermore, pursuant to yet another aspect of the present invention, the arcuate notches of the first and second pluralities of arcuate notches are equal in dimension and oriented symmetrically about an equatorial plane of the tire except that the arcuate notches of the second plurality are circumferentially offset by a distance of one-half the circumferential dimension between the arcuate notches of the first plurality.

Pursuant to another aspect of the present invention, the retread element comprises a cap composed of a first compound for an outer tread and a base composed of a second compound harder than the first compound, the second compound forming a base for the outer tread.

Additionally, pursuant to another aspect of the present invention, a boundary between the cap and the base is disposed a predetermined distance radially inward from an outer surface of the cap, the predetermined distance being equal to the depth of the first and second pluralities of arcuate notches.

The present invention further provides a retread element for securing to an attachment area of a used carcass. The retread element has a tread pattern comprising a first circumferential groove separating the tread pattern into a first shoulder rib and an intermediate rib and a second circumferential groove separating the tread pattern into the intermediate rib and a second shoulder rib. The tread pattern further comprises a first plurality of identical arcuate notches extending axially and circumferentially across the first circumferential groove and a second plurality of identical arcuate notches extending axially and circumferentially across the second circumferential groove. The first plurality of arcuate notches is offset circumferentially from the second plurality of arcuate notches. Each arcuate notch of the first and second pluralities of arcuate notches begins at a first distance from an equatorial plane of the tire and terminates at a second distance from the equatorial plane of the tire.

Pursuant to another aspect of the present invention, the first distance is larger than the second distance.

Additionally, pursuant to a further aspect of the present invention, the retread element further comprises a cap composed of a first compound for an outer tread and a base composed of a second compound harder than the first compound, the second compound forming a base for the outer tread.

Pursuant to another aspect of the present invention, a boundary between the cap and the base is disposed a predetermined distance radially inward from an outer surface of the cap, the predetermined distance being equal to the depth of the first and second pluralities of arcuate notches.

According to yet another aspect of the present invention, each arcuate notch of the first and second pluralities of arcuate notches terminates with a ramp extending arcuately and radially outward to outer surfaces of the first and second shoulder ribs.

Pursuant to a further aspect of the present invention, each of the first and second pluralities of arcuate notches narrows as each notch extends nearer an equatorial plane of the tire.

Definitions

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Carcass plies" comprise parallel longitudinal reinforcing members which are wrapped around the beads.

"Circumferential" means lines or directions extending along the perimeter of the surface of the annular tread perpendicular to the axial direction.

"Crown" refers to that portion of the tire within the width area of the tread in the vicinity of the tread.

"Design feature" includes enough of the tread pattern to constitute at least one notch on each tread region.

"Equatorial plane" refers to the plane perpendicular to the tire's axis of rotation and passing through the center of its tread. "Tread Shoulder Rib" refers to portion of tread adjacent the tire sidewall.

"Footprint" refers to the contact patch or area of contact of the tire tread with a flat surface at zero speed and under normal load and pressure or under specified load, pressure and speed conditions.

"Global treadwear" refers to normal treadwear, generally evenly distributed around a tire.

"Irregular treadwear" refers to uneven patterns of wear, sometimes localized where one side or edge of the tread wears faster than another.

"Lateral Edge" means the axially outermost extremes of the tread.

"Radial" and "radially" are used to mean directions radially toward or away from the axis of rotation of the tire.

BRIEF DESCRIPTION OF THE DRAWINGS

The invention will be described by way of example and with reference to the accompanying drawings in which.

DETAILED DESCRIPTION OF AN EXAMPLE EMBODIMENT OF THE INVENTION

Figure 1:
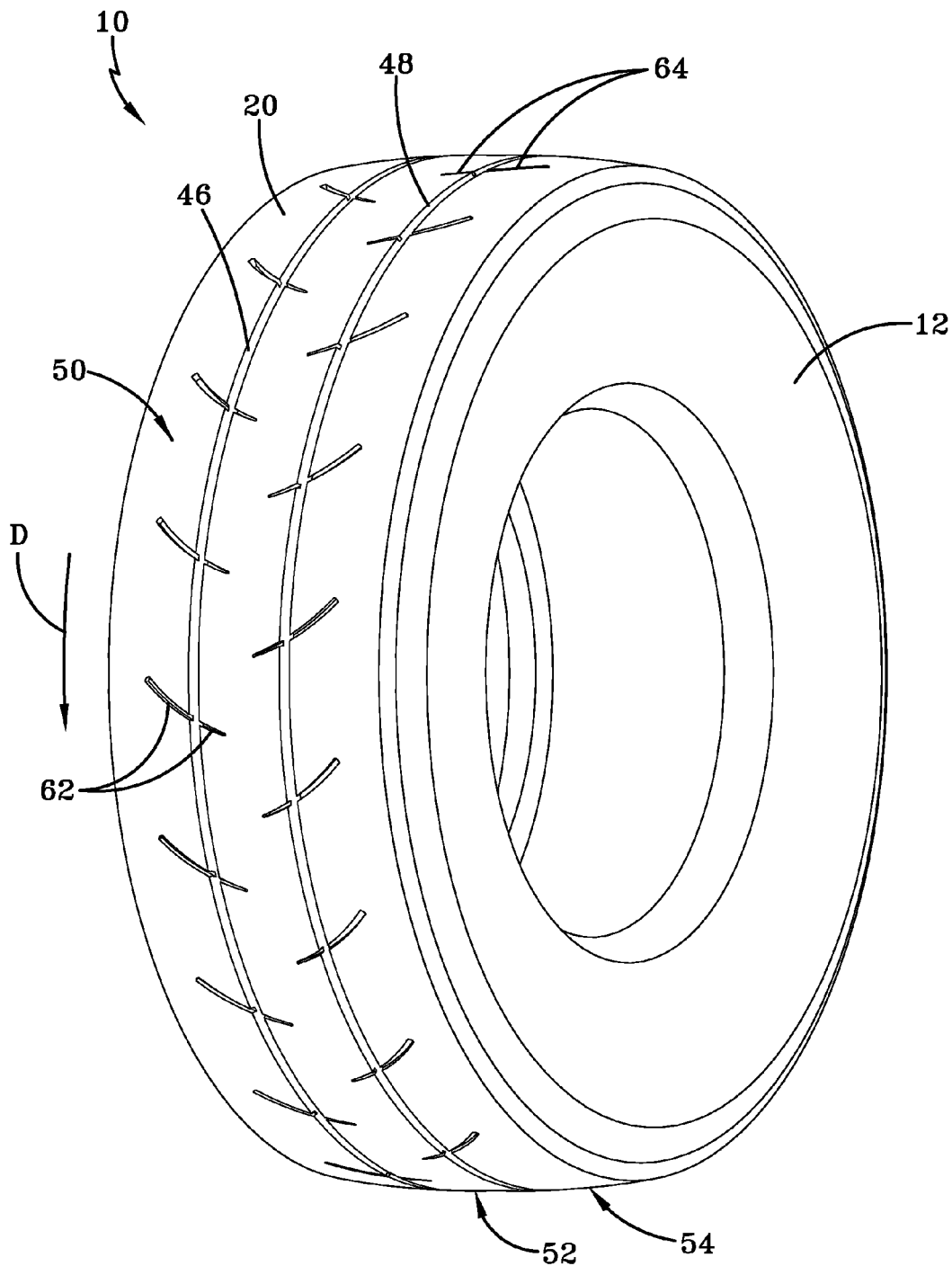
FIG. 1 is a perspective side elevation view of a tire configured according to the present invention.
Figure 2:
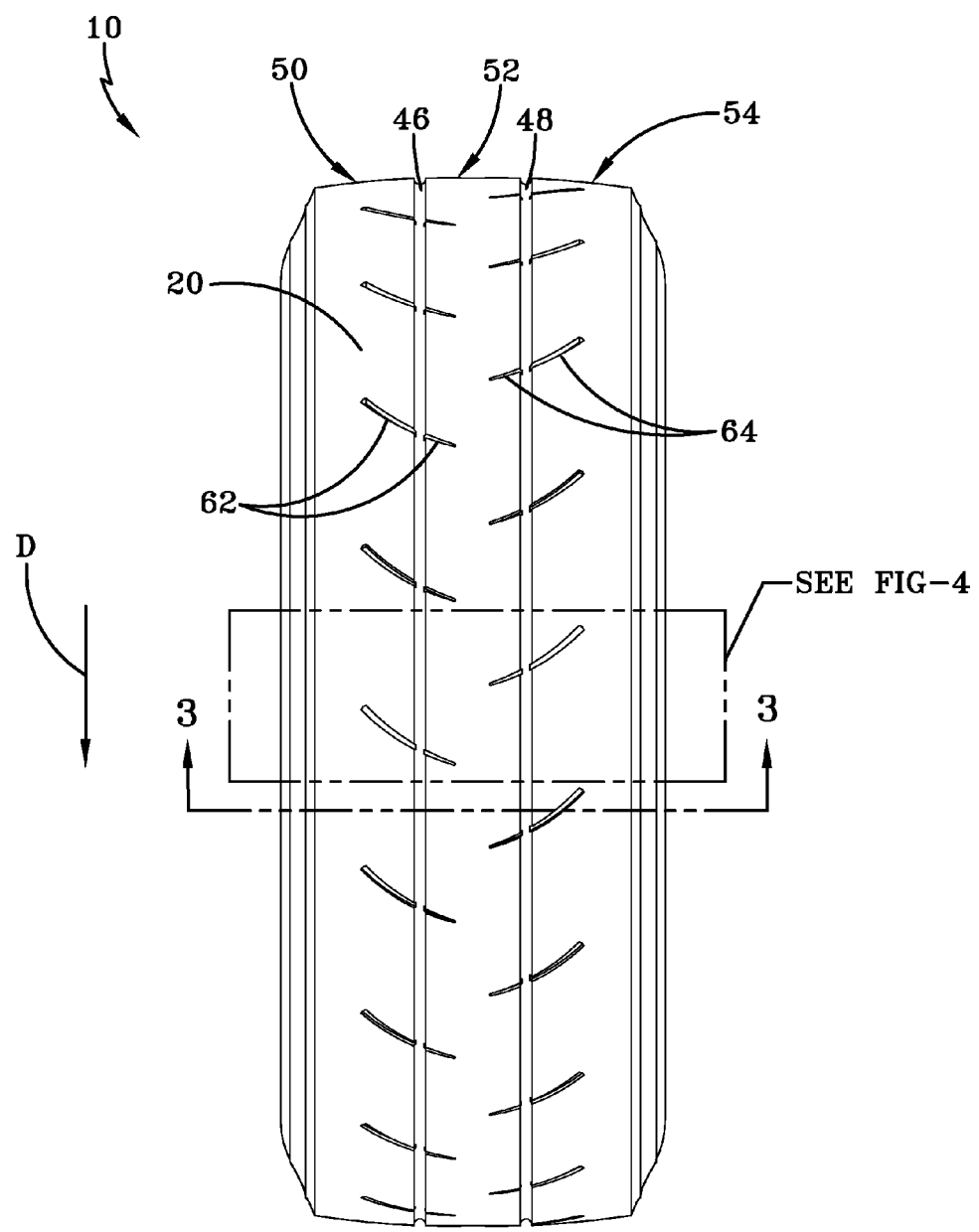
FIG. 2 is a front elevation view of a portion of the tire of FIG. 1.
Figure 3:
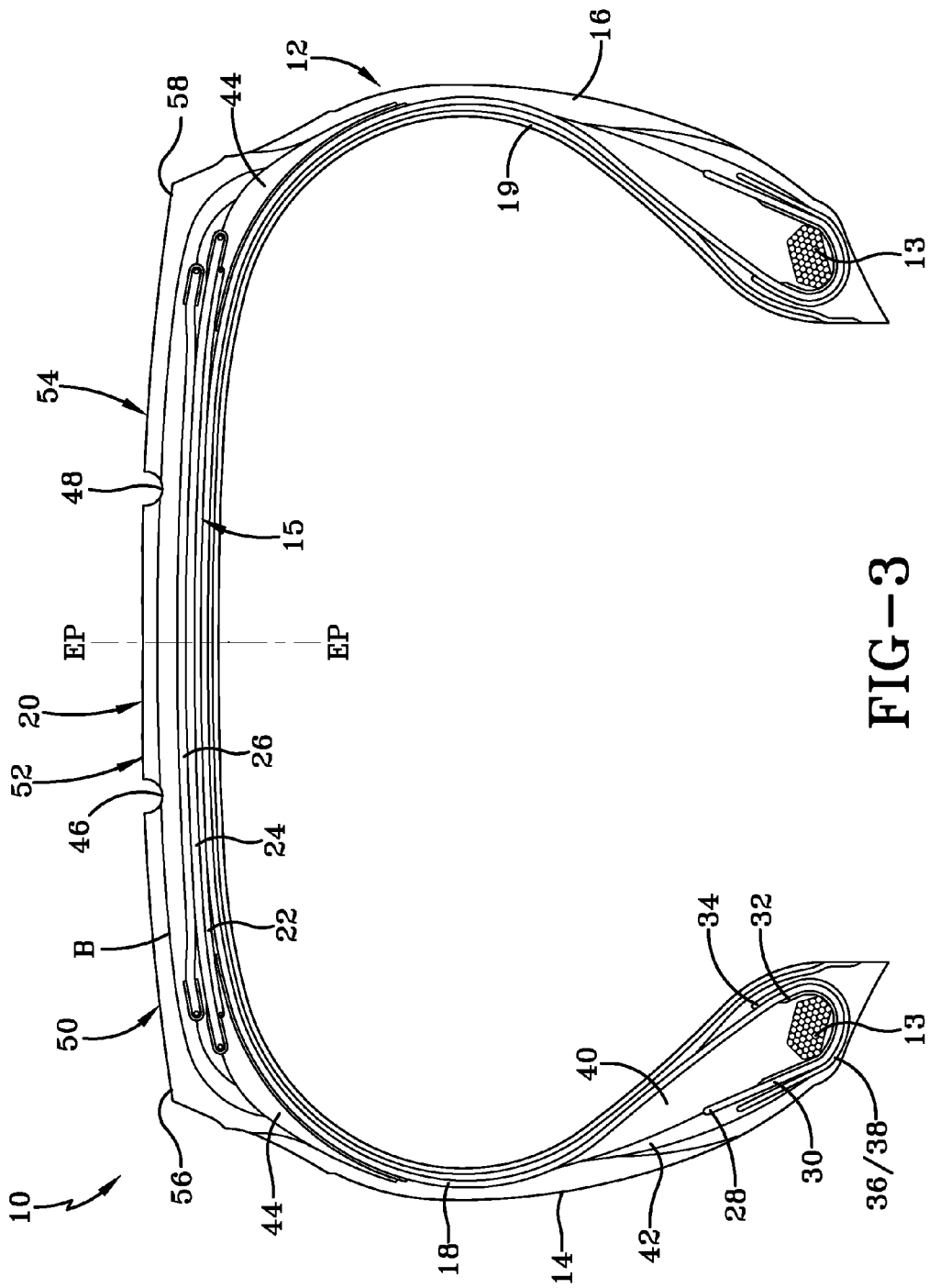
FIG. 3 is a transverse sectional view through the tire of FIG. 1.

With reference to FIGS. 1-3, an example truck racing tire 10 in accordance with the present invention is depicted, preferably for use on a drive axle of a racing truck. While intended specifically for truck racing tires, the principles of the invention may find alternative uses in other applications apparent to those skilled in the art.

The tire 10 has a tread element 20 and a casing, or carcass 12. The carcass 12 has two sidewalls 14, 16 and one or more radial plies 18 extending from, and wrapped about, two annular beads 13. The tire 10 further includes a belt reinforcement structure 15 disposed radially outward of the plies 18.

The plies 18 and the belt reinforcement structure 15 are cord reinforced elastomeric material, the cords being preferably steel wire filaments and the elastomer preferably being a vulcanized rubber material. Similarly, the annular beads 13 have steel wires wrapped into a bundle known as the bead core. An innerliner 19, preferably of halobutyl rubber, forms a somewhat air impervious chamber to contain the air pressure when the tire 10 is inflated.

As shown in FIG. 3, the belt reinforcement structure 15 may have three cord reinforced belts 22, 24, 26. Additionally, the plies 18 may include a rubber gum strip 28. A ply turnup 30 in the area of the beads 13 is reinforced with a flipper 32, a chipper 34, gum and fabric chafers 36, 38, gum strips 40, elastomeric wedges 42, and a plurality of elastomeric strips or wedges 44 in the lateral extremes of the belts 22, 24, 26 adjacent the lateral edge of the tread element 20. Although not required to the practice of the inventive concept, these features are disclosed as features employed in the example embodiment.

Figure 5:
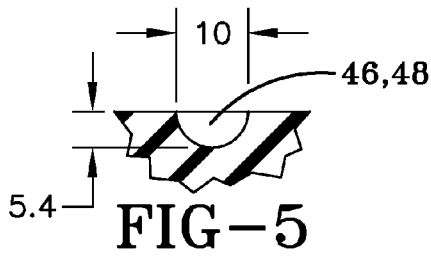
FIG. 5 is a section view through a notch of FIG. 4 taken along the line 5-5.

The example tread element 20 preferably has a pair of circumferentially continuous (or annular) grooves 46, 48 which divide the tread element 20 into three tread ribs comprising an intermediate rib 52 separating a pair of shoulder ribs 50, 54. As seen in FIG. 5, the depth of the grooves 46, 48 may typically be on the order of 5.1 mm, for heat and water evacuation, with an outer width of 10.0 mm. The example tread element 20 is configured such that each rib 50, 52, 54 has approximately equal widths, or axial dimensions. The equatorial plane EP of the tire 10, as best seen in FIG. 3, extends centrally through the intermediate rib 52. Each shoulder rib 50, 54 is configured with an angled lateral edge surface 56, 58, which optimizes vehicle stability and handling. More grooves may be used dependent on the width of the tread element and other design considerations such as mold shape, tread pattern, material compounds, traction/stability requirements, etc.

As shown in FIG. 3, the radially outermost belt 26 may be of relatively reduced distance from the base of the circumferentially continuous grooves 46, 48, on the order of 2 to 5 mm. Additionally, an undertread (not shown) may be configured to have a relatively reduced thickness, preferably dimensioned as 5 mm. The reduced thickness of the tread element 20 and undertread between the tread element and belt reinforcement structure 15 reduces material content and weight for optimizing handling, stability, and temperature control.

Figure 4:
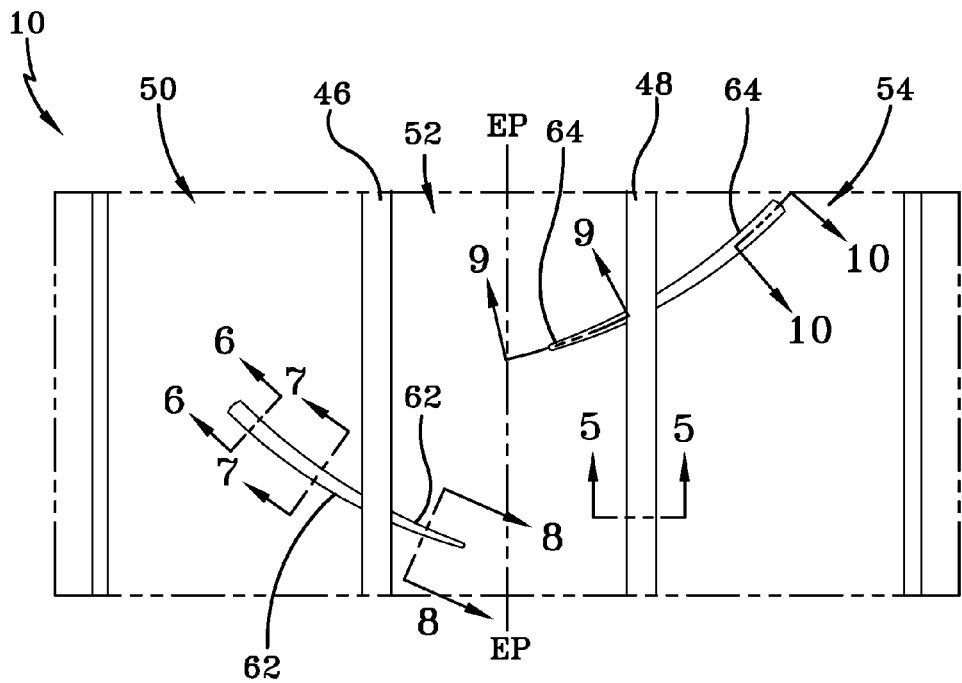
FIG. 4 is an enlarged section view of the tread portion of the tire of FIG. 1.

As shown specifically in FIG. 4, the tread element 20 further has a first group of circumferentially spaced, arcuate notches 62 and a second group of circumferentially spaced, arcuate notches 64. The first notches 62 and second notches 64 extend laterally and circumferentially, respectively, from the shoulder ribs 50, 54, laterally and circumferentially across the grooves 46, 48 to the intermediate rib 52 and toward the equatorial plane EP. The first notches 62 each begin in the shoulder rib 50 and terminate in the intermediate rib 52. The second notches each begin in the shoulder rib 54 and terminate in the intermediate rib 52. Each of the first notches 62 is identical to the other first notches 62 and each of the second notches 64 is identical to the other second notches 64.

The first and second notches 62, 64 extend continuously across the grooves 46, 48. In other words, the arcs defined by the notches 62, 64 contain no discontinuities as the notches extend circumferentially and laterally (or axially) from the axially outer shoulder ribs 50, 54 to the intermediate rib 52 (as best shown in FIG. 4).

Figure 6:
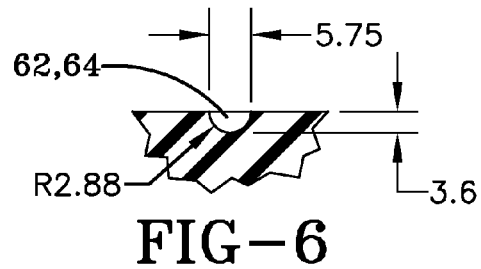
FIG. 6 is a longitudinal section view through a notch of FIG. 4 taken along the line 6-6.
Figure 7:
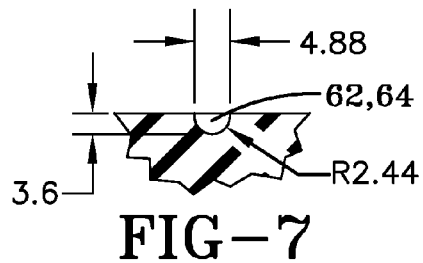
FIG. 7 is a longitudinal section view through a notch of FIG. 4 taken along the line 7-7.
Figure 8:
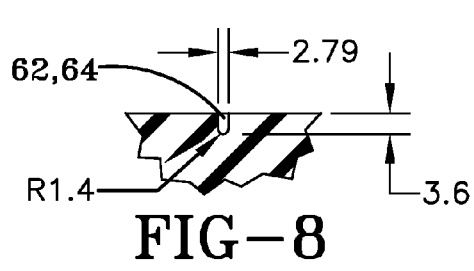
FIG. 8 is a longitudinal section view through a notch of FIG. 4 taken along the line 8-8.
Figures 9, 10:
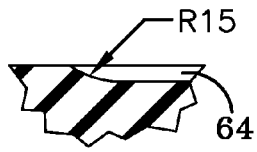
FIG. 9 is a transverse section view through a groove of FIG. 4 taken along the line 9-9.
FIG. 10 is a transverse section view through a groove of FIG. 4 taken along the line 10-10.

Each notch 62 begins at the same distance from the equatorial plane EP. The beginning of each notch 62 of the first group, as shown in FIG. 6, is generally U-shaped in cross-section and has a depth on the order of 3.6 mm with a base radius of curvature of 2.88 mm and an outer width of 5.75 mm. As shown in FIG. 10 with regard to notch 64, the initial depth is attained by a ramp extending radially inward from the outer surface of the shoulder rib 50 at a radius of curvature of 3.60 mm. As shown in FIG. 7, as each notch 62 extends toward the equatorial plane EP, the base radius of curvature and outer width of each notch 62 decrease to 2.44 mm and 4.88 mm, respectively. As shown in FIG. 8, after each notch 62 has extended across the groove 46, the base radius of curvature and outer width of each notch 62 has further decreased to 1.40 mm and 2.79 mm, respectively. As shown in FIG. 9 with regard to notch 64, each notch 62 terminates at the same distance from the equatorial plane EP and as a ramp extending radially upward to the outer surface of the intermediate rib 52 at a radius of curvature of 15.00 mm. Thus, each notch 62 narrows, or tapers, as it extends arcuately toward the equatorial plane EP of the tire 10. Further, the overall configuration of each notch 62, as shown in FIGS. 1-10, defines a plurality of identical arcuate notches 62 extending laterally and circumferentially across the circumferential groove 46 and being oriented convexly toward the direction of rotation D of the tire 10 to enhance traction of the tire.

As shown in FIGS. 4-10, the notches 64 of the second group may be equal in dimension and oriented symmetrically about the equatorial plane EP of the tire 10 compared to the notches 62 of the first group, except that the notches 64 of the second group may be circumferentially offset by a distance of one-half the circumferential dimension between the notches 62 of the first group. The pitch of the groups of notches 62, 64 and the amount of offset, if any, may be adjusted to any suitable amount depending on traction, handling, and stability requirements for the truck racing tire in accordance with the present invention.

Additionally, it may be preferred that the tread element 20 has a cap/base layer construction in which the cap is composed of a relatively softer compound for the outer tread while the base is composed of a harder compound. The softer cap compound may provide high griping and handling performance characteristics, while the hard and cool-running base compound may improve lateral stability and handling, reduce heat generation, and improve the tire's resistance characteristics to tread damage. Location of the cap and base boundary B may be 3.5 mm (slightly less than the 3.6 mm depth of the arcuate notches 62, 64) from the tread surface so that a user may safely detect the harder base layer when the tread cap has almost completely worn away. FIG. 3 illustrates in broken line the boundary B between the softer cap and harder base. The dual composition of the tread element 20 along a boundary line placed at the same depth as the depth of the notches 62, 64 may also provide an indication of tire wear, thus increasing the likelihood that a driver will immediately detect an unsafe wear condition within the tire 20.

For producing a retread element similar to the tread element 20 of FIGS. 1-10, a flat retread mold may have two substantially linear ridges to define the circumferential grooves 46, 48 and other arcuate ridges to define the notches 62, 64. A green tread element of suitable composition and dimensions may be placed on the mold. The flat retread mold may be closed and the retread element cured for 8 min at 150 C or any suitable parameters. The cured retread element 20 may then be secured in a known manner to a worn and ground attachment area radially outside of a used carcass 18 and belt reinforcement structure 15 to produce a retreaded tire 10 for truck racing applications.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A retreaded pneumatic truck tire comprising:
a used carcass having a uniform annular attachment area; and
a retread element secured to the attachment area of the used carcass, the retread element having a tread pattern comprising a first circumferential groove separating the tread pattern into a first shoulder rib and an intermediate rib and a second circumferential groove separating the tread pattern into the intermediate rib and a second shoulder rib, the tread pattern further comprising a first plurality of identical arcuate notches extending axially and circumferentially across the first circumferential groove and a second plurality of identical arcuate notches extending axially and circumferentially across the second circumferential groove, the first plurality of arcuate notches being offset circumferentially from the second plurality of arcuate notches, each of the first plurality of arcuate notches beginning in the first shoulder rib and terminating in the intermediate rib, each of the second plurality of arcuate notches beginning in the second shoulder rib and terminating in the intermediate rib, each of the first and second pluralities of arcuate notches being oriented convexly toward a direction of rotation of the retreaded pneumatic truck tire, each of the first and second pluralities of arcuate notches having a width which decreases from the terminal end in the first and second shoulder ribs to the terminal end in the intermediate rib, and each of the first and second pluralities of arcuate notches having a curved bottom base defined by a radius which decreases from the terminal end in the first and second shoulder ribs to the terminal end in the intermediate rib.

2. The retreaded pneumatic truck tire of claim 1 wherein the used carcass includes radial plies extending from, and wrapped about, two annular beads and the tire further includes a belt reinforcement structure disposed radially outward of the radial plies.

3. The retreaded pneumatic truck tire of claim 1 wherein the used carcass includes an innerliner for containing air pressure when the tire is inflated.

4. The retreaded pneumatic truck tire of claim 1 further including a belt reinforcement structure having three cord reinforced belts.

5. The retreaded pneumatic truck tire of claim 1 wherein the shoulder ribs are configured with angled lateral edge surfaces for optimizing vehicle stability and handling.

6. The retreaded pneumatic truck tire of claim 1 wherein each arcuate notch of the first plurality of arcuate notches begins at a first distance from an equatorial plane of the tire and terminates at a second distance from the equatorial plane of the tire.

7. The retreaded pneumatic truck tire of claim 6 wherein each arcuate notch of the second plurality of arcuate notches begins at the first distance from an equatorial plane of the tire and terminates at the second distance from the equatorial plane of the tire.

8. The retreaded pneumatic truck tire of claim 1 wherein each arcuate notch of the first and second pluralities of arcuate notches is generally U-shaped in cross-section and has a depth of about 3.6 mm.

9. The retreaded pneumatic truck tire of claim 1 wherein each arcuate notch of the first and second pluralities of arcuate notches begins with a ramp extending arcuately and radially inward from outer surfaces of the first and second shoulder ribs.

10. The retreaded pneumatic truck tire of claim 1 wherein each arcuate notch of the first and second pluralities of arcuate notches terminates with a ramp extending arcuately and radially outward to outer surfaces of the first and second shoulder ribs.

11. The retreaded pneumatic truck tire of claim 1 wherein the arcuate notches of the first and second pluralities of arcuate notches are equal in dimension and oriented symmetrically about an equatorial plane of the tire except that the arcuate notches of the second plurality are circumferentially offset by a distance of one-half the circumferential dimension between the arcuate notches of the first plurality.

12. The retreaded pneumatic truck tire of claim 1 wherein the retread element comprises a cap composed of a first compound for an outer tread and a base composed of a second compound harder than the first compound, the second compound forming a base for the outer tread.

13. The retreaded pneumatic truck tire of claim 12 wherein a boundary between the cap and the base is disposed a predetermined distance radially inward from an outer surface of the cap, the predetermined distance being slightly less than the depth of the first and second pluralities of arcuate notches.

14. A retread element for securing to an attachment area of a used carcass, the retread element having a tread pattern comprising a first circumferential groove separating the tread pattern into a first shoulder rib and an intermediate rib and a second circumferential groove separating the tread pattern into the intermediate rib and a second shoulder rib, the tread pattern further comprising a first plurality of identical arcuate notches extending axially and circumferentially continuously across the first circumferential groove and a second plurality of identical arcuate notches extending axially and circumferentially continuously across the second circumferential groove, the first plurality of arcuate notches being offset circumferentially from the second plurality of arcuate notches, each arcuate notch of the first and second pluralities of arcuate notches beginning at a first distance from an equatorial plane of the tire and terminating at a second distance from the equatorial plane of the retread element, each of the first plurality of arcuate notches beginning in the first shoulder rib and terminating in the intermediate rib, each of the second plurality of arcuate notches beginning in the second shoulder rib and terminating in the intermediate rib, each of the first and second pluralities of arcuate notches being oriented convexly toward a direction of rotation of the retreaded pneumatic truck tire, each of the first and second pluralities of arcuate notches having a width which decreases from the terminal end in the first and second shoulder ribs to the terminal end in the intermediate rib, and each of the first and second pluralities of arcuate notches having a curved bottom base defined by a radius which decreases from the terminal end in the first and second shoulder ribs to the terminal end in the intermediate rib.

15. The retread element of claim 14 wherein the first distance is larger than the second distance.

16. The retread element of claim 14 further comprising a cap composed of a first compound for an outer tread and a base composed of a second compound harder than the first compound, the second compound forming a base for the outer tread.

17. The retread element of claim 16 wherein a boundary between the cap and the base is disposed a predetermined distance radially inward from an outer surface of the cap, the predetermined distance being slightly less than the depth of the first and second pluralities of arcuate notches.

18. The retread element of claim 14 wherein each arcuate notch of the first and second pluralities of arcuate notches terminates with a ramp extending arcuately and radially outward to outer surfaces of the first and second shoulder ribs.

* * * * *